United States Patent
Noll et al.

(10) Patent No.: US 9,386,097 B2
(45) Date of Patent: Jul. 5, 2016

(54) USING VALUES REPRESENTED AS INTERNET PROTOCOL (IP) ADDRESSES TO ACCESS RESOURCES IN A NON-INTERNET PROTOCOL ADDRESS SPACE

(75) Inventors: Landon Curt Noll, Sunnyvale, CA (US); Claudio DeSanti, Oakland, CA (US)

(73) Assignee: Cisco Technology, Inc., San Jose, CA (US)

( * ) Notice: Subject to any disclaimer, the term of this patent is extended or adjusted under 35 U.S.C. 154(b) by 756 days.

(21) Appl. No.: 12/766,746

(22) Filed: Apr. 23, 2010

(65) Prior Publication Data

US 2011/0264779 A1 Oct. 27, 2011

(51) Int. Cl.
*G06F 15/173* (2006.01)
*H04L 29/08* (2006.01)
*H04L 29/12* (2006.01)

(52) U.S. Cl.
CPC ...... *H04L 67/1097* (2013.01); *H04L 29/12801* (2013.01); *H04L 29/12886* (2013.01); *H04L 61/6004* (2013.01); *H04L 61/6045* (2013.01); *H04L 29/12037* (2013.01); *H04L 29/12066* (2013.01); *H04L 61/106* (2013.01); *H04L 61/1511* (2013.01); *H04L 61/2596* (2013.01); *H04L 61/6059* (2013.01)

(58) Field of Classification Search
CPC .......................... H04L 63/227; H04L 61/2596
USPC .................................. 709/223, 226; 370/401
See application file for complete search history.

(56) References Cited

U.S. PATENT DOCUMENTS

| | | | |
|---|---|---|---|
| 6,484,245 B1 * | 11/2002 | Sanada et al. | 711/164 |
| 7,617,290 B1 | 11/2009 | Cheriton et al. | |
| 2004/0071148 A1 * | 4/2004 | Ozaki et al. | 370/401 |
| 2010/0023621 A1 * | 1/2010 | Ezolt et al. | 709/226 |
| 2011/0153780 A1 | 6/2011 | Rao et al. | |
| 2011/0283350 A1 * | 11/2011 | Brandt et al. | 726/13 |

FOREIGN PATENT DOCUMENTS

| | | |
|---|---|---|
| CN | 1467957 A | 1/2004 |
| EP | 1083768 A1 | 3/2001 |
| EP | 1372297 B1 | 10/2008 |

OTHER PUBLICATIONS

PCT International Search Report and The Written Opinion of The International Searching Authority for PCT Application PCT/US2011/032905 (which claims priority to U.S. Appl. No. 12/766,746), ISA/US, mailed Jul. 6, 2011 (nine pages).
Recio et al., "A Remote Direct Memory Access Protocol Specification," RFC 5040, The Internet Society, Oct. 2007 (sixty-six pages).
Response Addressing Written Opinion of the International Searching Authority dated Oct. 23, 2012, Jun. 7, 2013, EP Application 11717418.5, filed with European Patent Office, Munich, Germany (four pages).
"The First Office Action," State Intellectual Property Office of the People's Republic of China, Beijing, China Jul. 2, 2014 (in Chinese and English translation, thirty-two pages).

* cited by examiner

*Primary Examiner* — Glenford Madamba
(74) *Attorney, Agent, or Firm* — The Law Office of Kirk D. Williams

(57) ABSTRACT

Non-Internet Protocol (IP) centric resources are accessed based on a value in the form of an IP address. This value (represented as the IP address) is converted to a non-IP address, which is to used access one or more non-IP address space resources. This value (represented as the IP address) typically includes an encoding of the non-IP address and/or an indirect reference (e.g., table index, pointer to a memory location) to the non-IP address.

25 Claims, 6 Drawing Sheets

USING VALUES REPRESENTED AS INTERNET PROTOCOL (IP) ADDRESSES TO ACCESS RESOURCES IN A NON-INTERNET PROTOCOL ADDRESS SPACE

TECHNICAL FIELD

The present disclosure relates generally to communicating information.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology, especially using Internet Protocol (IP) and for accessing resources in the Internet Protocol (IP) address space.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DESCRIPTION OF EXAMPLE EMBODIMENTS

1. Overview

Figure 1A:
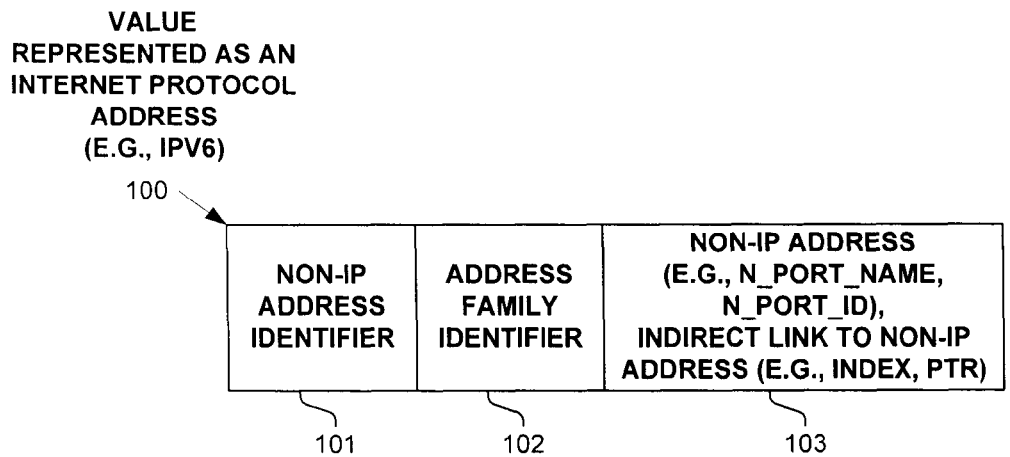
FIG. 1A illustrates a value represented as an Internet Protocol (IP) address and used in one embodiment.

Disclosed are, inter alia, methods, apparatus, computer-storage media, mechanisms, and means associated with using values represented as Internet Protocol (IP) addresses to access resources in a non-IP address space.

One embodiment performs a method performed by a particular machine for accessing non-Internet Protocol (IP) centric resources based on an IP address, with the method comprising: converting, by the particular machine, a value represented as the IP address to a non-IP address; and responsive to said converting operation, using the non-IP address to access one or more non-IP address space resources; wherein the value includes one or more of a group consisting of: the non-IP address encoded therein.

One embodiment includes: requesting data, by an application being executed by the particular machine, with said data request specifying the value represented as the IP address; and receiving said requested data from said one or more non-IP address space resources. In one embodiment, the value is a 128-bit value represented as an IPv6 address; and wherein said one or more non-IP address space resources are part of a Fibre Channel Storage Area Network (SAN). In one embodiment, the application is Network File System (NFS). In one embodiment, the NFS is responsive to a mount command specifying a hostname; and wherein the method includes: requesting resolution of a hostname by a remote Domain Name Service (DNS) server; and receiving the value in a response corresponding to said resolution request; wherein said converting operation is responsive to said receiving of the value from the DNS server. In one embodiment, the non-IP address is a Fibre Channel N_Port_Name; and wherein said using the non-IP address to access said one or more non-IP address space resources includes performing a conversion of the N_Port_Name to a N_Port_ID.

In one embodiment, the group further consists of: an indirect reference to the non-IP address; wherein the non-IP address is a Fibre Channel N_Port_Name; and wherein said using the non-IP address to access said one or more non-IP address space resources includes performing a conversion of the N_Port_Name to a N_Port_ID. In one embodiment, the group further consists of: an indirect reference to the non-IP address; and wherein the non-IP address is a Fibre Channel N_Port_ID. In one embodiment, the value is a 128-bit value and the IP address is an IPv6 address. One embodiment includes: requesting resolution of a hostname by a remote Domain Name Service (DNS) server; and receiving the value in a response corresponding to said resolution request; wherein said converting operation is responsive to said receiving of the value from the DNS server.

One embodiment performs a method performed by a particular machine for accessing non-Internet Protocol (IP) centric resources based on an IP address, with the method comprising: processing, as part of processing an IP protocol stack by the particular machine, a request to access one or more non-IP address space resources, based on a value corresponding to the non-IP address space resources, with the value represented as an IP address, and with said processing including: identifying, based on the value, a network layer protocol different than IP; determining, by the particular machine, a non-IP network layer address based on the value; and responsive to said identification of the network layer protocol different than IP, accessing, as part of processing a protocol stack corresponding to the network layer protocol different than IP, one or more non-IP address space resources based on the non-IP network layer address.

In one embodiment, the value includes one or more of a group consisting of: the non-IP address space network layer address encoded therein, and an indirect reference to the non-IP address space network layer address. In one embodiment, the value is a 128-bit value represented as an IPv6 address; wherein the non-IP address space network layer address is one or more of the group consisting of: a Fibre Channel Node_Name, N_Port_Name, or N_Port_ID; and wherein the network layer protocol is Fibre Channel. In one embodiment, the request to access said one or more non-IP address space resources specifies a hostname; and wherein said processing the IP protocol stack includes: requesting resolution of the hostname by a remote Domain Name Service (DNS) server; and receiving the value in a response corresponding to said resolution request.

2. Description

Disclosed are, inter alia, methods, apparatus, computer-storage media, mechanisms, and means associated with using values represented as Internet Protocol (IP) addresses to access resources in a non-IP address space. Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. A processing element may be a general processor, task-specific processor, or other implementation for performing the corresponding processing. The embodiments described hereinafter embody various aspects and configurations within the scope and spirit of the invention, with the figures illustrating exemplary and non-limiting configurations. Note, computer-readable media and means for performing methods and processing block operations (e.g., a processor and memory or other apparatus configured to perform such operations) are disclosed and are in keeping with the extensible scope and spirit of the invention. Note, the term "apparatus" is used consistently herein with its common definition of an appliance or device.

Note, the steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also note, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

One embodiment performs a method, comprising: converting, by a particular machine, a value represented as an Internet Protocol (IP) address to a non-IP address; and using, by the particular machine being responsive to said converting operation, the non-IP address to access one or more non-IP address space resources; wherein the value includes one or more of a group consisting of: the non-IP address encoded therein.

One embodiment comprises: requesting data, by an application being executed by the particular machine, with said data request specifying the value represented as the IP address; and receiving said requested data from said one or more non-IP address space resources. In one embodiment, the value is a 128-bit value represented as an IPv6 address; and wherein said one or more non-IP address space resources are part of a Fibre Channel Storage Area Network (SAN). In one embodiment, the application is Network File System (NFS). In one embodiment, the NFS is responsive to a mount command specifying a hostname; and wherein the method includes: requesting resolution of a hostname by a remote Domain Name Service (DNS) server; and receiving the value in a response corresponding to said resolution request; wherein said converting operation is responsive to said receiving of the value from the DNS server. In one embodiment, the non-IP address is a Fibre Channel N_Port_Name; and wherein said using the non-IP address to access said one or more non-IP address space resources includes performing a conversion of the N_Port_Name to a N_Port_ID. In one embodiment, the group further consists of: an indirect reference to the non-IP address; wherein the non-IP address is a Fibre Channel N_Port_Name; and wherein said using the non-IP address to access said one or more non-IP address space resources includes performing a conversion of the N_Port_Name to a N_Port_ID. In one embodiment, the group further consists of: an indirect reference to the non-IP address; and wherein the non-IP address is a Fibre Channel N_Port_ID. In one embodiment, the value is a 128-bit value and the IP address is an IPv6 address. One embodiment includes: requesting resolution of a hostname by a remote Domain Name Service (DNS) server; and receiving the value in a response corresponding to said resolution request; wherein said converting operation is responsive to said receiving of the value from the DNS server.

One embodiment performs a method, comprising: processing, as part of processing an Internet Protocol (IP) protocol stack by a particular machine, a request to access one or more non-IP address space resources, based on a value corresponding to the non-IP address space resources, with the value represented as an IP address, and with said processing including: identifying, based on the value, a network layer protocol different than IP; determining, by the particular machine, a non-IP network layer address based on the value; and responsive to said identification of the network layer protocol different than IP, accessing, as part of processing a protocol stack corresponding to the network layer protocol different than IP, one or more non-IP address space resources based on the non-IP network layer address.

In one embodiment, the value includes one or more of a group consisting of: the non-IP address space network layer address encoded therein, and an indirect reference to the non-IP address space network layer address. In one embodiment, the value is a 128-bit value represented as an IPv6 address; wherein the non-IP address space network layer address is one or more of the group consisting of: a Fibre Channel Node_Name, N_Port_Name, or N_Port_ID and wherein the network layer protocol is Fibre Channel. In one embodiment, the request to access said one or more non-IP address space resources specifies a hostname; and wherein said processing the IP protocol stack includes: requesting resolution of the hostname by a remote Domain Name Service (DNS) server; and receiving the value in a response corresponding to said resolution request.

One embodiment includes an apparatus, comprising: one or more processors; and one or more memories; wherein said one or more processors are configured to perform operations for accessing non-Internet Protocol (IP) centric resources based on an IP address, with said operations comprising: converting a value represented as the IP address to a non-IP address; and responsive to said converting operation: using the non-IP address to access one or more non-IP address space resources; wherein the value includes the non-IP address encoded therein.

In one embodiment, said operations include: requesting data, by an application being executed by the apparatus, with said data request specifying the value represented as the IP address; and receiving said requested data from said one or more non-IP address space resources. In one embodiment, the value is a 128-bit value represented as an IPv6 address; and wherein said one or more non-IP address space resources are part of a Fibre Channel Storage Area Network (SAN). In one embodiment, the non-IP address is a Fibre Channel N_Port_Name; and wherein said using the non-IP address to access said one or more non-IP address space resources includes performing a conversion of the N_Port_Name to a N_Port_ID. In one embodiment, the value is a 128-bit value and the IP address is an IPv6 address. In one embodiment, said operations include: requesting resolution of a hostname by a remote Domain Name Service (DNS) server; and receiving the value in a response corresponding to said resolution request; wherein said converting operation is responsive to said receiving of the value from the DNS server.

Expressly turning to the figures, FIG. 1 illustrates a value 100 represented as an Internet Protocol (IP) address (e.g., a 128-bit, IPv6 address), which is used in one embodiment. Typically, value 100 will correspond to a non-routable IP address. The first set of bits (e.g., non-IP address identifier 101) typically indicates that the address is not actually a standard IP address, but rather needs to be converted, to a non-IP address and processed differently, such as not by an IP protocol stack. In one embodiment, a next set of bits (e.g., address family identifier 102) identifies the non-IP address family (e.g., Fibre Channel, InfiniBand, Uniform Resource Identifier [URI]). In one embodiment, a next set of bits (e.g., other protocol address 103, such as, but not limited to a non-IP address) identifies the non-IP address either directly (e.g., the non-IP address is encoded therein) or indirectly (e.g., an index into a table containing the non-IP address, a pointer to another location or data structure containing the non-IP address). Note, the phrase "encoded therein" as used herein is an extensible phrase to mean that the bits may directly represent the address, or the non-IP address is represented after some kind of compression or other data manipulation from which the actual non-IP address can be recovered.

Figure 1B:
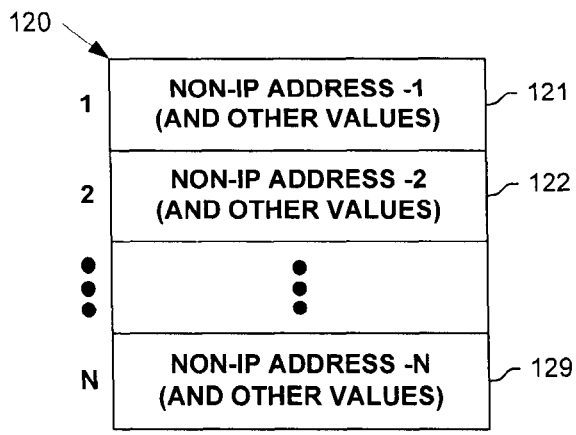
FIG. 1B illustrates a table for indirectly determining a non-IP address from an IP address and used in one embodiment.

FIG. 1B illustrates a table 120 for indirectly determining a non-IP address from an IP address. For example, in one embodiment, non-IP address field 103 (FIG. 1A) includes an index into table 120 for determining the non-IP address (and possibly other values (e.g., parameters, options, addresses) required for accessing one or more resources in a corresponding non-IP address space. One embodiment an indirect reference into table 120 in order to allow entries 121-129 to store more information than can be encoded in non-IP address field 103.

Note, the address structures illustrated in relation to FIGS. 1A-B are just a subset of an extensible number of encoding schemes and data structures that can be used. For example, there may be no address family identifier 102, especially if it is inherent in the embodiment (e.g., from non-IP address identifier 101, stored in an entry 121-129, there is only one non-IP address family used). An embodiment typically needs only to identify, based on the value represented as an IP address, that a non-IP address family is referenced such that appropriate protocol processing can be performed, and what is the non-IP address.

For example, one embodiment allows for an IP application to access data in a Fibre Channel Storage Area Network (SAN) using an IP address. Thus, non-IP address identifier 101 (FIG. 1A) is set to a reserved value (e.g., acquired by reserving a corresponding "48 range" of IPv6 address space); address family identifier 102 (FIG. 1A) is set to a predetermined value representing accessing data in a Fibre Channel SAN; and non-IP address 103 (FIG. 1A) is set to the N_Port_Name or N_Port_ID of the Fibre Channel SAN resource to be accessed (e.g., for retrieving and/or storing data). In one embodiment, non-IP address 103 is 64 bits, which allows a 64-bit Fibre Channel N_Port_Name to be directly stored therein. In one embodiment, non-IP address 103 is 64 bits, which is not large enough to store a URI, which may be a lengthy string, so non-IP address 103 stores an indirect reference into table 120 (FIG. 1B). One embodiment allows both of these types of representation of a non-IP address, and uses address family identifier 102 to identify whether non-IP address 103 contains the non-IP address (e.g., a Fibre Channel N_Port_Name in this example), an indirect reference to the non-IP address (e.g., a URI in this example), or some other direct or indirect non-IP address.

Furthermore, many IP applications do not initially refer to an IP address, but rather to a hostname. This hostname is subsequently resolved through a service, such as, but not limited to, a Domain Name Service (DNS). Thus, a hostname can be associated to a value represented as an IP address, which in actuality, refers to a non-IP address space address for accessing one or more resources in a corresponding non-IP address space. For example, a DNS server can be configured to associate the hostname with this value represented as an IP address, with the DNS server not being required to understand the semantics that the IP address is really a reference to a non-IP address and resource in a non-IP address space.

Figure 2A:
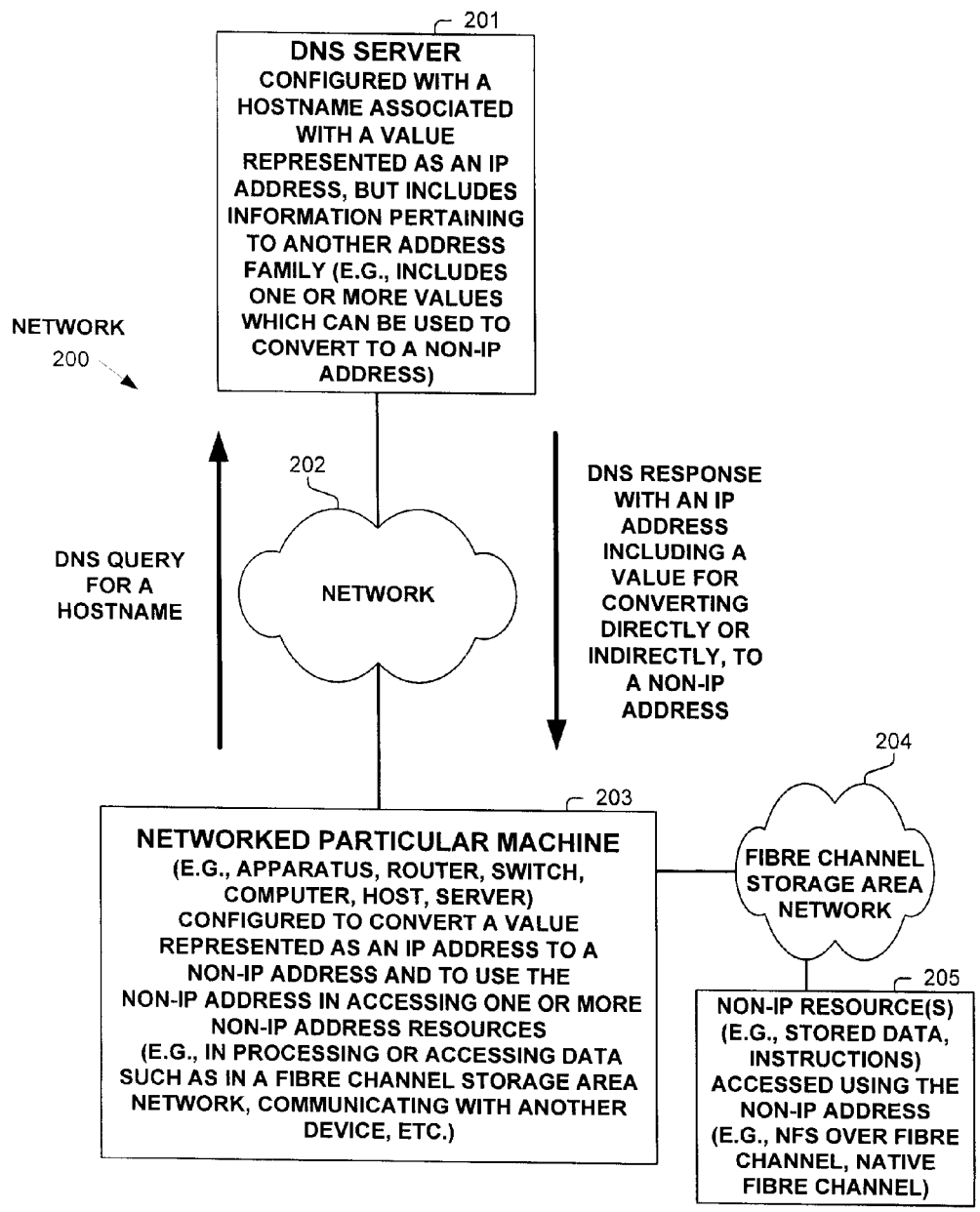
FIG. 2A illustrates a network operating according to one embodiment.

FIG. 2A illustrates a network 200 operating according to one embodiment. As shown, network 200 includes: a networked particular machine 203 (e.g., apparatus, router, switch, computer, host, server) communicatively coupled via network 202 to a DNS server 201. DNS server 201 is configured with an association of hostnames to IP addresses, with these IP addresses referring to IP addresses and/or non-IP addresses represented as IP addresses. Networked particular machine 203 is also communicatively coupled via Fibre Channel Storage Area Network (SAN) 204 to non-IP resource(s) 205 (e.g., stored data, instructions, etc.) accessed using the non-IP address (e.g., Network File System over Fibre Channel, native Fibre Channel).

In an illustrative example of network 200 of one embodiment, networked particular machine 203 receives or generates a request from an IP application specifying a hostname. Networked particular machine 203 performs a DNS query for the hostname to DNS server 201, which returns a value represented as an IP address. Networked particular machine, possibly in processing by an IP stack, identifies the IP address as being a value represented as an IP address, but referring to a non-IP address resource, and converts it into the non-IP address, which is a Fibre Channel N_Port_Name or N_Port_ID in this example. Using the non-IP address, networked particular machine 203 accesses one or more non-IP resources, which in this example, accesses data from a storage device 205 of Fibre Channel SAN 204. In one embodiment, this data is accessed by networked particular machine 203 over Fibre Channel network 204 via Network File System (NFS) such as, but not required to be, responsive to a mount command, Remote Procedure Calls (RPCs), and/or Remote Direct Memory Access (RDMA, Remote DMA).

Thus, for example, one embodiment allows Internet Protocol (IP) centric services to access Fibre Channel resources via a Fibre Channel N_Port_Name, Node_Name, or N_Port_ID embedded in a value represented as an IP Address. Moreover, one embodiment allows applications (e.g., IP centric services) to access Fibre Channel or other technology resources using hostnames or IP addresses (e.g., values represented as IP addresses), with these applications being unaware that the resources they are accessing are not IP-centric resources. Thus, one embodiment allows IP based applications and administrative tools that only know how to reference a remote file server by DNS and an IP address can access non-IP centric resources, such as, but not limited to Fibre Channel resources without the application having to understand the Fibre Channel address space.

For example, consider an environment that uses an automounter. An application may reference a local path of "/host/fizzbin.example.org/curds/n/whey" where "fizzbin.example.org" is the hostname of the remote file server and "/curds/n/whey" is the path that application is referencing on that remote file server. In an IP centric world, the hostname "fizzbin.example.org" is translated into a remote file service IP address. One embodiment allows these applications to access, using a value represented as an IP address (e.g., it looks to the application as an IP address, but is translated to a non-IP address and possibly invokes different processing) different protocol-based resources, such as a Fibre Channel based remote file service instead of an IP centric one.

In a similar way, many clustering and high performance computing applications rely today on the RDMAP protocol. However, typically an existing application uses an Internet DNS name to identify a remote machine with which to communicate using RDMAP. The applications resolve the DNS name to an IP address and this IP address is used to establish a RDMAP connection with the remote machine. By using a non-IP address represented as an IP address, one embodiment allows non-IP resources to be accessed by converting this IP address to a non-IP address and corresponding processing the request according to the other protocol with the non-IP address, such as to access resources in a Fibre Channel SAN.

In one embodiment, networked particular machine 203 accesses the non-IP resource(s) which are coupled to a network different than Fibre Channel network 204, internal to networked particular machine 203, or otherwise directly or indirectly communicatively coupled to networked particular machine 203. One embodiment uses communication technology described in Rao et al., U.S. patent application Ser. No. 12/641,909, filed Dec. 18, 2009. One embodiment uses communication technology described in Cheriton et al., U.S. Pat. No. 7,617,290, issued Nov. 10, 2009.

Figure 2B:
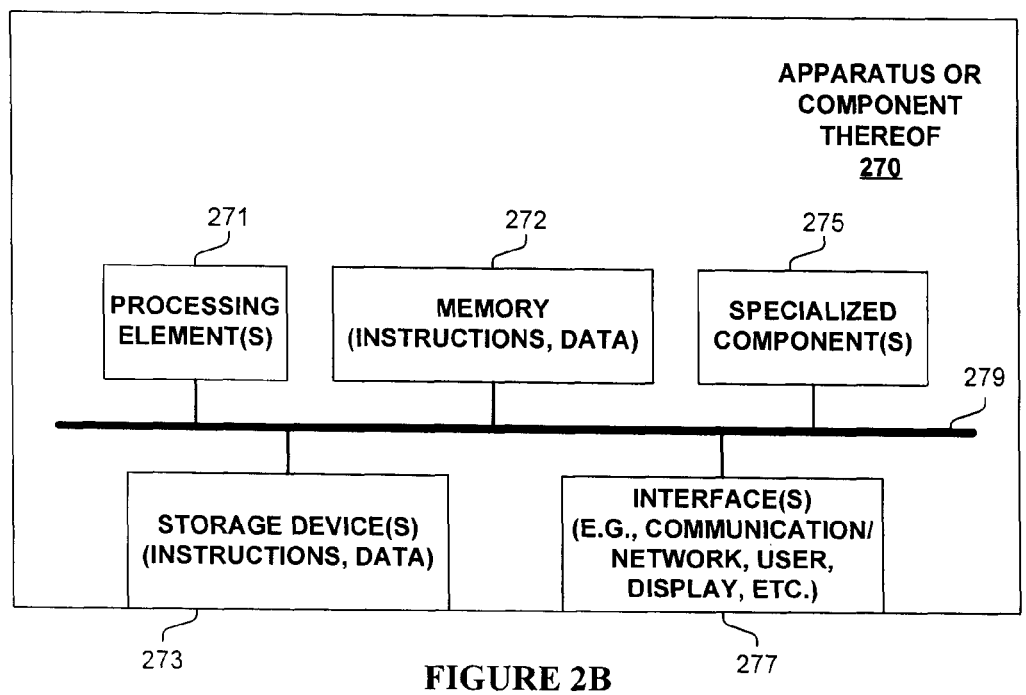
FIG. 2B illustrates an apparatus or component used in one embodiment.

FIG. 2B is a block diagram of an apparatus or component 270 thereof used in one embodiment associated with using values represented as Internet Protocol (IP) addresses to access resources in a non-IP address space. In one embodiment, apparatus or component 270 performs one or more processes corresponding to one of the flow diagrams illustrated herein or otherwise described herein.

In one embodiment, apparatus or component 270 includes one or more processing element(s) 271, memory 272, storage device(s) 273, specialized component(s) 275 (e.g. optimized hardware such as for performing operations, etc.), and interface(s) 277 for communicating information (e.g., sending and receiving packets, user-interfaces, displaying information, etc.), which are typically communicatively coupled via one or more communications mechanisms 279, with the communications paths typically tailored to meet the needs of the application. In one embodiment apparatus or component 270 corresponds to, or is part of, network device 101 of FIG. 1.

Various embodiments of apparatus or component 270 may include more or less elements. The operation of apparatus or component 270 is typically controlled by processing element(s) 271 using memory 272 and storage device(s) 273 to perform one or more tasks or processes. Memory 272 is one type of computer-storage medium, and typically comprises random access memory (RAM), read only memory (ROM), flash memory, integrated circuits, and/or other memory components. Memory 272 typically stores computer-executable instructions to be executed by processing element(s) 271 and/or data which is manipulated by processing element(s) 271 for implementing functionality in accordance with an embodiment. Storage device(s) 273 are another type of computer-storage medium, and typically comprise solid state storage media, disk drives, diskettes, networked services, tape drives, and other storage devices. Storage device(s) 273 typically store computer-executable instructions to be executed by processing element(s) 271 and/or data which is manipulated by processing element(s) 271 for implementing functionality in accordance with an embodiment.

Figure 3:
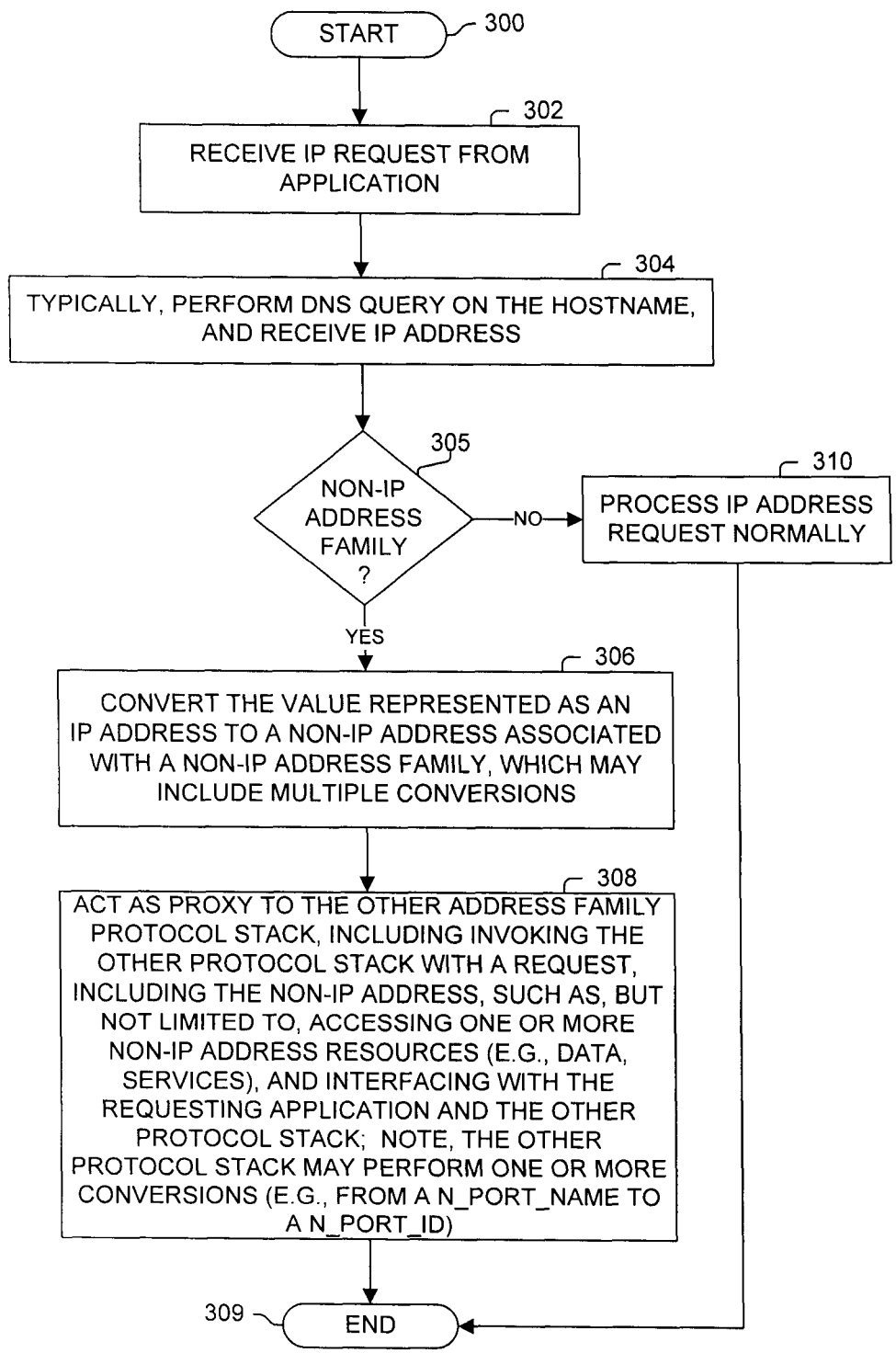
FIG. 3 illustrates a process performed in one embodiment.

FIG. 3 illustrates a process performed in one embodiment. Processing begins with process block 300. In process block 302, an IP request is received from an application (e.g., possibly an application that is not aware that the specified IP address, or IP address associated with the specified hostname, refers to a non-IP address and will be used to access non-IP address space resources). Next, in process block 304, a DNS query is performed to resolve a hostname to an IP address, if required. As determined in process block 305, if the IP address refers to an IP address family, then processing continues with process block 310 to process the request normally. Otherwise, in process block 306, the value represented as an IP address is converted to a non-IP address associated with a non-IP address. Note, this conversion may take multiple conversions (e.g., possibly converting from the IP address to a Fibre Channel N_Name, which is converted to a N_Port_ID_N_Port using a Fibre Channel resolution service). Then, in process block 308, the particular machine acts as a proxy between the application and the non-IP address family resource to communicate the proper request(s) to the non-IP address family resource (e.g., data, services), and to receive response(s) and communicate proper response(s) to the calling application (possibly an IP application not aware that it is accessing a non-IP centric resource). In one embodiment, this operation includes acting as proxy to the other address family protocol stack, including invoking the other protocol stack with a request, including the non-IP address, such as, but not limited to, accessing one or more non-IP address resources and interfacing with the requesting application and the other protocol stack. In one embodiment, the other protocol stack performs one or more conversions (e.g., from a Fibre Channel N_Port_Name to a N_Port_ID using a Fibre Channel resolution service). Processing of the flow diagram of FIG. 3 is complete as indicated by process block 309.

Figure 4:
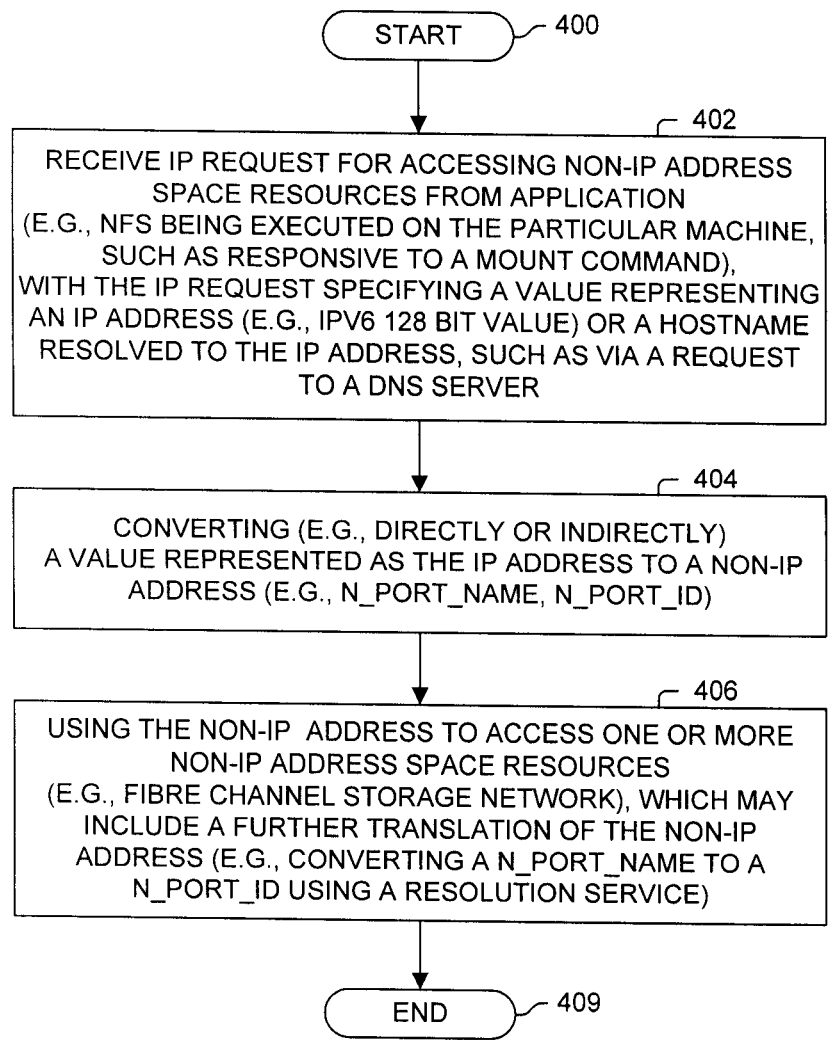
FIG. 4 illustrates a process performed in one embodiment.

FIG. 4 illustrates a process performed in one embodiment. Processing begins with process block 400. In process block 402, an IP request is received from, or generated by, an application, with this IP request being for accessing one or more non-IP address space resources (e.g., NFS being executed on the particular machine, such as responsive to a mount command). The IP request specifies a value represented as an IP address (e.g., IPv6 128-bit value) or a hostname resolved to this IP address (e.g., using a DNS server). Next, in process block 404, the value represented as the IP address is directly or indirectly converted to a non-IP address (e.g., Fibre Channel N_Port_Name, N_Port_ID). In process block 406, the non-IP address is used to access one or more non-IP address space resources (e.g., Fibre Channel storage network), which may include a further translation of the non-IP address (e.g., converting a Fibre Channel N_Port_Name to a N_Port_ID using a resolution service). Processing of the flow diagram of FIG. 4 is complete as indicated by process block 409.

Figure 5:
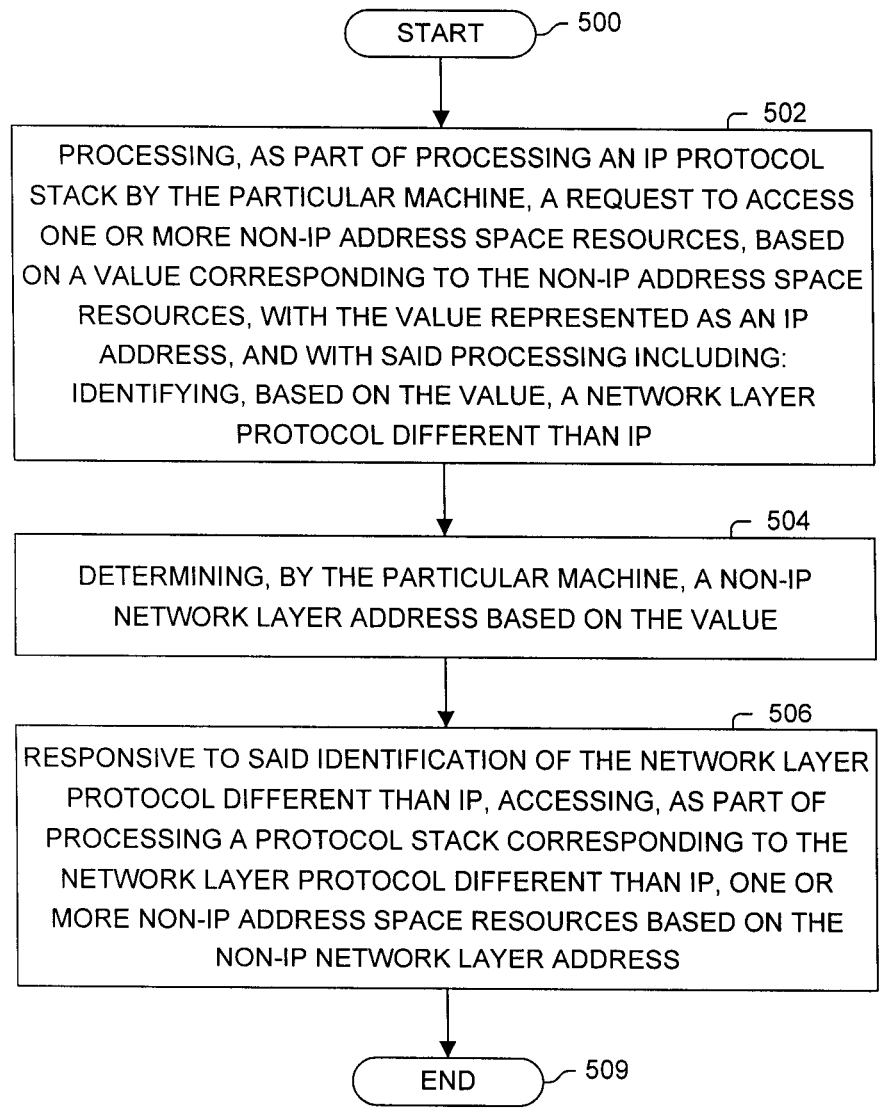
FIG. 5 illustrates a process performed in one embodiment.

FIG. 5 illustrates a process performed in one embodiment. Processing begins with process block 500. In process block 502, the particular machine processes, as part of processing an IP protocol stack, a request to access one or more non-IP address space resources based on a value corresponding to the non-IP address space resources. This value is represented as an IP address. A network layer protocol different than IP is identified based on this value. (In other words, the IP protocol stack identifies that the IP address refers to a non-IP address, with the request to be processed by a different network layer protocol stack). In process block 504, the non-IP network layer address is determined based on the value represented as the IP address (e.g., by the IP protocol stack, by the non-IP network layer protocol stack, some other processing by the particular machine). Next, in process block 506, one or more non-IP address space resources are accessed based on the non-IP network layer address as part of processing a protocol stack corresponding to the network layer protocol different than IP.

So, in other words, one embodiment not only converts the value represented as an IP address to a non-IP address, it traps processing of the original IP centric request, and triggers the processing of the request using the non-IP address. This processing may effectively cause another protocol stack to be invoked, which may include jumping the top of the protocol stack of the non-IP address space.

Processing of the flow diagram of FIG. 5 is complete as indicated by process block 509.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method, comprising:
  requesting data, by an Internet Protocol (IP) application being executed on a particular machine, with said data request specifying a non-routable IP address for accessing said data, with the non-routable IP address consisting of a single IP address, with one or more bits of the non-routable IP address defining that the non-routable IP address is not actually an IP address but rather defines an address in a non-IP address space;
  in response to determining that the non-routable IP address includes said one or more bits of the single IP address defining that the non-routable IP address is not actually an IP address but rather defines an address in a non-IP address space, directly converting, by the particular machine, the non-routable IP address to a non-IP address; and
  using, by the particular machine being responsive to said converting operation, the non-IP address to access one or more non-IP address space resources which includes receiving said requested data from said one or more non-IP address space resources and providing said requested data to the IP application; and
  wherein the non-IP address is encoded within the non-routable IP address.

2. The method of claim 1, wherein the non-routable IP address is a 128-bit value represented as an IPv6 address; and wherein said one or more non-IP address space resources are part of a Fibre Channel Storage Area Network (SAN).

3. The method of claim 2, wherein the application is Network File System (NFS).

4. The method of claim 3, wherein the NFS is responsive to a mount command specifying a hostname; and wherein the method includes: requesting resolution of a hostname by a remote Domain Name Service (DNS) server; and receiving the non-routable IP address in a response corresponding to said resolution request; wherein said converting operation is responsive to said receiving of the non-routable IP address from the DNS server.

5. The method of claim 4, wherein the non-IP address is a Fibre Channel N_Port_Name; and wherein said using the non-IP address to access said one or more non-IP address space resources includes performing a conversion of the N_Port_Name to a N_Port_ID.

6. The method of claim 2, wherein the group further consists of: an indirect reference to the non-IP address; wherein the non-IP address is a Fibre Channel N_Port_Name; and wherein said using the non-IP address to access said one or more non-IP address space resources includes performing a conversion of the N_Port_Name to a N_Port_ID.

7. The method of claim 2, wherein the group further consists of: an indirect reference to the non-IP address; and wherein the non-IP address is a Fibre Channel N_Port_ID.

8. The method of claim 1, wherein the non-routable IP address is a 128-bit value.

9. The method of claim 8, including: requesting resolution of a hostname by a remote Domain Name Service (DNS) server; and
  receiving the non-routable IP address in a response corresponding to said resolution request;
  wherein said converting operation is responsive to said receiving of the non-routable IP address from the DNS server.

10. A method, comprising:
  processing, as part of processing an Internet Protocol (IP) protocol stack by a particular machine, a data request to access data stored on one or more non-IP address space resources, with the data request specifying a non-routable IP address for accessing said data, with the non-routable IP address consisting of a single IP address, with one or more bits of the non-routable IP address defining that the non-routable IP address is not actually an IP address but rather defines an address in a non-IP address space and with said processing including: identifying, based on the non-routable IP address, a network layer protocol different than IP;

in response to determining that the non-routable IP address includes said one or more bits of the single IP address defining that the non-routable IP address is not actually an IP address but rather defines an address in a non-IP address space, determining, by the particular machine, a non-IP network layer address based on the non-routable IP address; and responsive to said identification of the network layer protocol different than IP, accessing, as part of processing a protocol stack corresponding to the network layer protocol different than IP on the particular machine, one or more non-IP address space resources based on the non-IP network layer address, which includes receiving said requested data from said one or more non-IP address space resources; and providing said requested data to the IP protocol stack.

11. The method of claim 10, wherein the non-routable IP address is a 128-bit value represented as an IPv6 address; wherein the non-IP address space network layer address is one or more of the group consisting of: a Fibre Channel Node_Name, N_Port_Name, or N_Port_ID; and wherein the network layer protocol is Fibre Channel.

12. The method of claim 10, wherein the request to access said one or more non-IP address space resources specifies a hostname; and wherein said processing the IP protocol stack includes: requesting resolution of the hostname by a remote Domain Name Service (DNS) server; and receiving the non-routable IP address in a response corresponding to said resolution request.

13. An apparatus, comprising:
one or more processors; and
one or more memories;
wherein said one or more processors are configured to perform operations for accessing non-Internet Protocol (IP) centric resources, with said operations including:
requesting data, by an Internet Protocol (IP) application being executed on the apparatus, with said data request specifying a non-routable IP address for accessing said data, with the non-routable IP address consisting of a single IP address, with one or more bits of the non-routable IP address defining that the non-routable IP address is not actually an IP address but rather defines an address in a non-IP address space, in response to determining that the non-routable IP address includes said one or more bits of the single IP address defining that the non-routable IP address is not actually an IP address but rather defines an address in a non-IP address space, directly converting, by the particular machine, the non-routable IP address to a non-IP address; and using, by the particular machine being responsive to said converting operation, the non-IP address to access one or more non-IP address space resources which includes receiving said requested data from said one or more non-IP address space resources and providing said requested data to the IP application; and wherein the non-IP address is encoded within the non-routable IP address.

14. The apparatus of claim 13, wherein the non-routable IP address is a 128-bit value represented as an IPv6 address; and wherein said one or more non-IP address space resources are part of a Fibre Channel Storage Area Network (SAN).

15. The apparatus of claim 14, wherein the non-IP address is a Fibre Channel N_Port_Name; and wherein said using the non-IP address to access said one or more non-IP address space resources includes performing a conversion of the N_Port_Name to a N_Port_ID.

16. The apparatus of claim 13, wherein the non-routable IP address is a 128-bit value.

17. The apparatus of claim 16, wherein said operations include: requesting resolution of a hostname by a remote Domain Name Service (DNS) server; and receiving the non-routable IP address in a response corresponding to said resolution request; wherein said converting operation is responsive to said receiving of the non-routable IP address from the DNS server.

18. The apparatus of claim 14, wherein said one or more bits of the single IP address defining that the non-routable IP address is not actually an IP address but rather defines an address in a non-IP address space are distinct from other one or more other portions of the non-routable IP address, with said converting operation using only said one or more other portions in said converting the non-routable IP address to the non-IP address.

19. The method of claim 1, wherein said one or more bits of the single IP address defining that the non-routable IP address is not actually an IP address but rather defines an address in a non-IP address space are distinct from other one or more other portions of the non-routable IP address, with said converting operation using only said one or more other portions in said converting the non-routable IP address to the non-IP address.

20. The method of claim 10, wherein said one or more bits of the single IP address defining that the non-routable IP address is not actually an IP address but rather defines an address in a non-IP address space are distinct from other one or more other portions of the non-routable IP address, with said converting operation using only said one or more other portions in said converting the non-routable IP address to the non-IP address.

21. The method of claim 1, wherein said one or more other portions of the non-routable IP address include a non-IP address family identifier of one or more bits identifying the non-IP address family of the non-IP address.

22. The method of claim 21, wherein the non-IP address family is Fibre Channel, InfiniBand, or Uniform Resource Identifier [URI].

23. The method of claim 10, wherein said one or more other portions of the non-routable IP address include a non-IP address family identifier of one or more bits identifying the non-IP address family of the non-IP address; and wherein the network layer protocol is said identified based on the non-IP address family identifier.

24. The apparatus of claim 13, wherein the said one or more other portions of the non-routable IP address include a non-IP address family identifier of one or more bits identifying the non-IP address family of the non-IP address.

25. The method of claim 10, comprising: processing, as part of processing the IP protocol stack by the particular machine, a second data request to access second data stored on one or more IP address space resources, with the second data request specifying a valid IP address for accessing said second data; and retrieving, by the particular machine, said second data based on the valid IP address.

* * * * *